(12) United States Patent
Nakakita

(10) Patent No.: US 8,138,260 B2
(45) Date of Patent: Mar. 20, 2012

(54) RUBBER COMPOSITION FOR SIDE WALL AND PNEUMATIC TIRE USING THE SAME

(75) Inventor: Issei Nakakita, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 10 days.

(21) Appl. No.: 12/601,917

(22) PCT Filed: Mar. 14, 2008

(86) PCT No.: PCT/JP2008/054762
§ 371 (c)(1),
(2), (4) Date: Nov. 25, 2009

(87) PCT Pub. No.: WO2008/149589
PCT Pub. Date: Dec. 11, 2008

(65) Prior Publication Data
US 2010/0179275 A1    Jul. 15, 2010

(30) Foreign Application Priority Data

Jun. 8, 2007 (JP) ................................. 2007-153066

(51) Int. Cl.
*B60C 1/00* (2006.01)
*C08L 7/00* (2006.01)
*C08K 3/36* (2006.01)
*C08K 3/04* (2006.01)

(52) U.S. Cl. ...................... 524/575.5; 524/517; 524/493; 524/496; 524/572; 524/543; 524/570; 524/571

(58) Field of Classification Search .................. 524/517, 524/493, 496, 572, 543, 570, 571, 575.5
See application file for complete search history.

(56) References Cited

U.S. PATENT DOCUMENTS

| | | | | |
|---|---|---|---|---|
| 6,402,867 B1 * | 6/2002 | Kaido et al. | .................. | 156/123 |
| 2005/0209390 A1 * | 9/2005 | Yagi et al. | ...................... | 524/493 |
| 2006/0183840 A1 | 8/2006 | Hirayama et al. | | |
| 2006/0205858 A1 * | 9/2006 | Hirayama et al. | ............ | 524/493 |
| 2007/0100061 A1 * | 5/2007 | Hattori et al. | .................. | 524/515 |
| 2007/0123636 A1 | 5/2007 | Hattori et al. | | |
| 2007/0142529 A1 * | 6/2007 | Uesaka et al. | ................ | 524/430 |

FOREIGN PATENT DOCUMENTS

| | | |
|---|---|---|
| CN | 1974648 A | 6/2007 |
| EP | 1382654 A1 | 1/2004 |
| EP | 1782966 A1 | 5/2007 |
| EP | 1790688 A1 | 5/2007 |
| EP | 1798257 A1 | 6/2007 |
| JP | 11-111060 A | 1/1999 |
| JP | 2001-302847 A | 10/2001 |
| JP | 2004-2584 A | 1/2004 |
| JP | 2004-143187 A | 5/2004 |
| JP | 2006-63093 A | 3/2006 |
| JP | 2006-083301 A | 3/2006 |
| JP | 2006-219631 A | 8/2006 |
| JP | 2006-249188 A | 9/2006 |
| JP | 2007-119629 A | 5/2007 |
| JP | 2007-177209 A | 7/2007 |
| JP | 2007-269259 A | 10/2007 |
| JP | 2007-291347 A | 11/2007 |
| WO | WO-2007/074617 A1 | 7/2007 |

OTHER PUBLICATIONS

Office Action dated May 31, 2011 of corresponding Chinese application No. 200880019241.3.
Extended European Search Report for European Application No. 08722158.6 dated May 31, 2010.

* cited by examiner

*Primary Examiner* — James J Seidleck
*Assistant Examiner* — Deve E Valdez
(74) *Attorney, Agent, or Firm* — Birch, Stewart, Kolasch & Birch, LLP

(57) ABSTRACT

By a rubber composition for a side wall, including a rubber component containing a natural rubber component consisting of a natural rubber and a modified natural rubber, 20 to 60 parts by mass of silica, and 0.5 to 15 parts by mass of at least any one of a terpene-based resin and a rosin-based resin based on 100 parts by mass of the rubber component, and a pneumatic tire provided with a side wall rubber using the same, a rubber composition for a side wall in which both of maintenance of properties desired in a rubber composition for a side wall such as durability and improvement in processibility can be realized while a use amount of a raw material derived from a petroleum source is reduced, and a pneumatic tire in which running safety is improved by providing with a side wall rubber using the same, are provided.

3 Claims, 1 Drawing Sheet

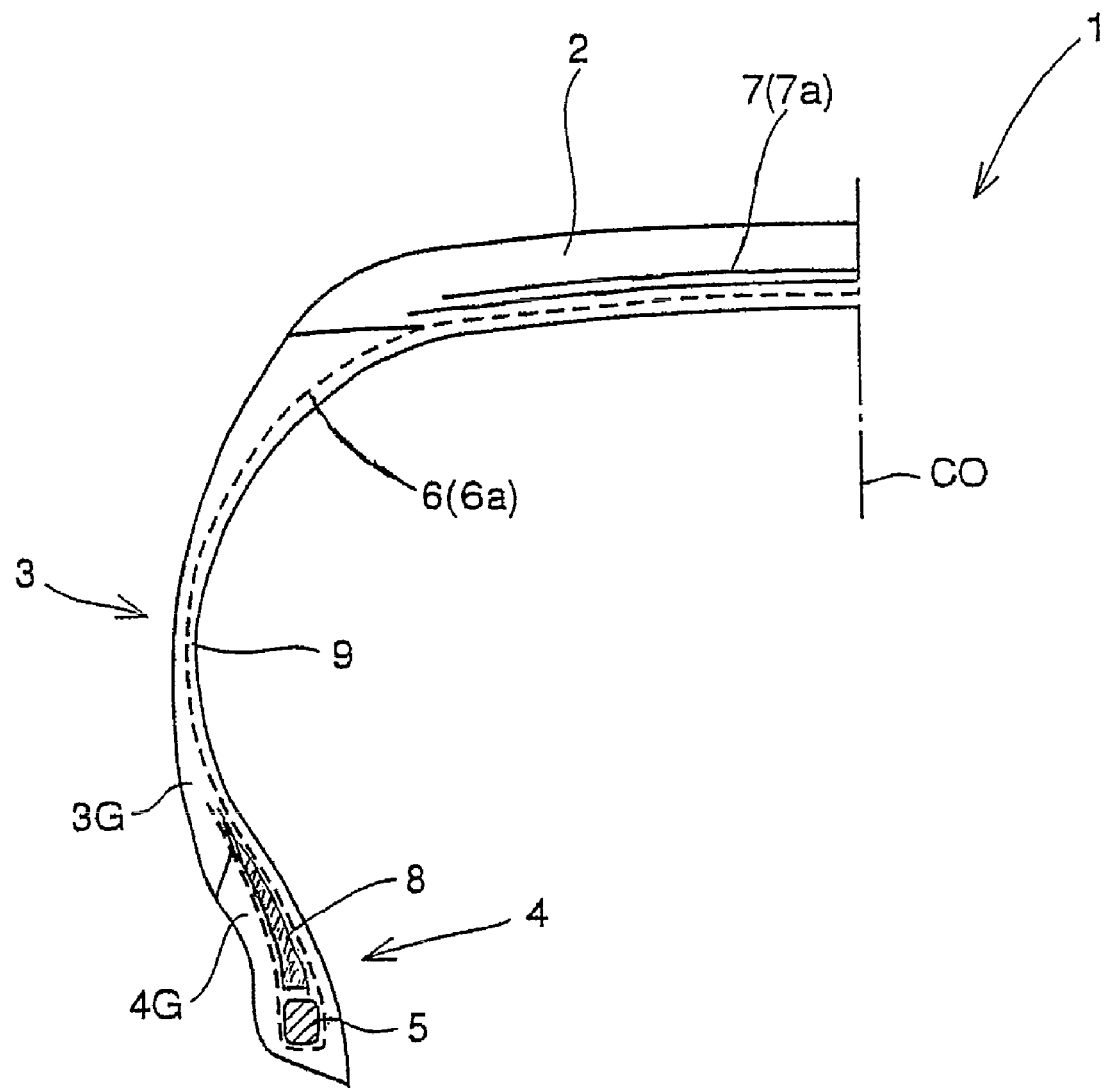

RUBBER COMPOSITION FOR SIDE WALL AND PNEUMATIC TIRE USING THE SAME

TECHNICAL FIELD

The present invention relates to a rubber composition for a side wall, and a pneumatic tire provided with a side wall rubber using the rubber composition.

BACKGROUND ART

Recently, with increased interest in environmental problems, a method for reducing a use amount of a raw material derived from a petroleum source has been studied in a variety of technical fields. A half or more of a total weight of a tire being generally sold now is constituted of a raw material being a petroleum source. For example, since a tire for a general passenger automobile contains such as about 20% by mass of a synthetic rubber, about 20% by mass of carbon black, a softening agent and a synthetic fiber, about 50% by mass or more of a whole tire is constituted of a raw material of the petroleum source. In addition, for the purpose Of improving processability by improvement in stickiness and reduction in a viscosity, a stickiness imparting agent is blended into the rubber composition for a tire and, as this stickiness imparting agent, a resin derived from a petroleum source such as a C5-based resin, a C9-based resin, and a phenol-based resin is generally used. Then, development of a rubber for a tire using a raw material derived from a natural source satisfying the required properties equivalent to or exceeding those when a raw material derived from a petroleum source is used, is desired.

Here, for the purpose of providing a tread rubber composition satisfying industrial workability, and by which performance excellent in the gripping property is obtained, a tread rubber composition in which 100 to 150 parts by weight of a terpene-based resin is compounded based on 100 parts by weight of a diene-based rubber is known. In addition, the technique capable of providing a rubber composition for a tire, which is a substitute for a petroleum-based aroma oil, and gives a small load on the environment, by containing 50 parts by weight or more of a natural rubber or a polyisoprene rubber among diene-based rubber components, and compounding 1 to 50 parts by weight of a terpene resin having a specified dynamic viscosity, is also known. Further, for the similar object, a rubber composition for a tire tread containing 50 parts by weight or more of a natural rubber among diene-based rubber components, and containing a reinforcing filler containing 60% by weight or more of silica, and in which 0.5 to 15 parts by weight of a phenol-modified terpene resin having a specified softening point, a specified hydroxy value and a specified dynamic viscosity is compounded therein, is also known. However, since these rubber compositions reduce a load on the environment by compounding a large amount of a natural source material without compounding a petroleum-based resin, but a rubber composition for a side wall, and performance required by this are not considered at all, and processability is not sufficient.

In addition, Japanese Patent Laying-Open No. 11-11106 (Patent Document 1) discloses a tubeless tire without an inner liner using a rubber composition for a case cord covering rubber layer, which contains 1 to 10 parts by weight of a stickiness imparting agent based on 100 parts by weight of a rubber component consisting of a diene-based rubber and bromide of an isobutylene/p-methylstyrene copolymer and, as this stickiness imparting agent, a terpene resin, and a rosin derivative are exemplified. According to Patent Document 1, it is described that adhesiveness with other tire member is excellent by using such the rubber composition.

In addition, Japanese Patent Laying-Open No. 2004-2584 (Patent Document 2) discloses a rubber composition in which 40 to 500 parts by weight of a filler and 15 parts by weight or more of a resin are compounded based on 100 parts by weight of a rubber component and, as this resin, a terpene resin and a rosin resin are exemplified. According to Patent Document 2, it is described that both of wet gripping performance and abrasion resistance can be realized by adopting such the composition, and using this in a tread part.

Further, Japanese Patent Laying-Open No. 2006-63093 (Patent Document 3) discloses a rubber composition for a tread, containing 8 parts by weight or more of a resin, and a filler consisting of 80% by weight or more of a white filler based on 100 parts by weight of a rubber component containing 80% by weight or more of a natural rubber and/or an epoxidized natural rubber and, as this resin, a terpene resin, an aromatic modified terpene resin, and a rosin resin are exemplified. According to Patent Document 3, it is described that a content of a source other than a petroleum can be enhanced and, at the same time, the previous performance can be similarly preserved.

However, the inventions disclosed in any of Patent Documents 1 to 3 do not consider a rubber composition for a side wall and performance required by this, and it is hard to say that processibility is sufficient.

Patent Document 1: Japanese Patent Laying-Open No. 11-11106
Patent Document 2: Japanese Patent Laying-Open No. 2004-2584
Patent Document 3: Japanese Patent Laying-Open No. 2006-63093

DISCLOSURE OF THE INVENTION

Problems to be Solved by the Invention

The present invention was done in order to solve the aforementioned problems, and an object of the present invention is to provide a rubber composition for a side wall which can realize both of maintenance of the properties desired in the rubber composition for a side wall such as durability, and improvement in processibility while a use amount of a raw material derived from a petroleum source is reduced, and a pneumatic tire in which running safety is improved by providing of a side wall rubber using the same.

Means for Solving the Problems

The rubber composition for a side wall of the present invention includes a rubber component having a natural rubber component consisting of a natural rubber and a modified natural rubber, 20 to 60 parts by mass of silica, and at least any one of 0.5 to 15 parts by mass of a terpene-based resin and a rosin-based resin based on 100 parts by mass of the rubber component.

It is preferable that the modified natural rubber used in the rubber composition for a side wall of the present invention is an epoxidized natural rubber.

It is preferable that the rubber component in the rubber composition of a side wall of the present invention consists of a natural rubber component.

The present invention further provides a pneumatic tire provided with a side wall rubber using the aforementioned rubber composition of the present invention.

Effects of the Invention

According to the present invention, the rubber composition for a side wall which can realize both of maintenance of the properties desired in the rubber composition for a side wall such as durability, and improvement in processability while a use amount of a raw material derived from a petroleum source is reduced, and a pneumatic tire in which running safety is improved by providing of a side wall rubber using the same.

BRIEF DESCRIPTION OF THE DRAWINGS

FIG. 1 is schematic cross-sectional view showing one example of the pneumatic tire of the present invention.

DESCRIPTION OF THE REFERENCE SIGNS

In the Figure, 1 is a tire, 2 is a tread part, 3 is a side wall part, 3G is a side wall rubber, 4 is a bead part, 5 is a bead core, 6 is a carcass, 6a is a carcass ply, 7 is a belt layer, 8 is a bead apex rubber, and 9 is an inner liner rubber.

BEST MODES FOR CARRYING OUT THE INVENTION

The rubber composition for a side wall of the present invention contains a rubber component, 20 to 60 parts by mass of silica, and 0.5 to 15 parts by mass of at least any one of a terpene-based rubber and a rosin-based resin based on 100 parts by mass of the rubber component. In addition, the rubber component used in the present invention contains a natural rubber component consisting of 30 to 70% by mass of a natural rubber (NR), and 30 to 70% by mass of a modified natural rubber (hereinafter simply also referred to as "natural rubber component").

<Rubber Component>

In the rubber composition for a side wall of the present invention, the rubber component contains a natural rubber component consisting of a natural rubber and a modified natural rubber. It is preferable that the rubber component of the present invention contains such the natural rubber component in a range of 50 to 100% by mass.

As the natural rubber used in the present invention, any natural rubber is included as far as it is known as a natural rubber, and a place of origin and the like are not limited. Such the natural rubber contains mainly cis 1,4 polyisoprene, and may contain trans 1,4 polyisoprene depending on the required property. Therefore, the natural rubber includes, in addition to a natural rubber containing mainly cis 1,4 polyisoprene, a natural rubber containing mainly trans 1,4 isoprene such as balata being one kind of Sapotaceae rubber plants produced in South America. The natural rubber component in the present invention can contain one kind or two or more kinds of such the natural rubbers (i.e. one component or two or more components). As such the natural rubber, for example, a natural rubber of a grade such as RSS#3, and TSR can be suitably used.

The modified natural rubber used in the present invention refers to a rubber in which the aforementioned rubber is modified or purified, and examples include such as an epoxidized natural rubber (ENR), a deproteinized natural rubber (DPNR), and a hydrogenated natural rubber. The natural rubber component in the present invention can contain one kind or two or more kinds of such the modified natural rubber. It is preferable that the natural rubber component in the present invention contains, as the modified natural rubber, an epoxidized natural rubber, among them.

The epoxidized natural rubber is one kind of modified natural rubbers in which an unsaturated double bond of the natural rubber is epoxidized, and a molecular cohesive force is enhanced by an epoxy group which is a polar group. For this reason, a glass transition temperature (Tg) is higher than that of the natural rubber, and a mechanical strength, abrasion resistance, and air permeability resistance are excellent. As such the epoxidized natural rubber, a commercially available epoxidized natural rubber such as ENR25 (manufactured by Kumpulan Guthrie Berhad) (epoxidization rate: 25%), and ENR50 (manufactured by Kumpulan Guthrie Berhad) (epoxidization rate: 50%) may be used, and an epoxidized natural rubber may be used. A method of epoxidizing a natural rubber is not particularly limited, and includes such as a chlorohydrin method, a direct oxidation method, a hydrogen peroxide method, an alkylhydroperoxide method, and a peracid method. Examples of the peracid method include a method of reacting organic peracid such as peracetic acid and performic acid as an epoxidizing agent with an emulsion of the natural rubber.

The epoxidization rate of the epoxidized natural rubber (ENR) is preferably 5 mol % or more, more preferably 25 mol % or more. Here, the epoxidization rate means a ratio of the number of epoxidized double bonds among the total number of the double bonds in the natural rubber before epoxidization ((number of epoxidized double bonds)/(number of double bonds before epoxidization)), and is obtained by, for example, titration analysis, or nuclear magnetic resonance (NMR) analysis. When the epoxidization rate of the epoxidized natural rubber (ENR) is less than 5 mol %, since a glass transition temperature of the epoxidized natural rubber (ENR) is low, there is a tendency that it is difficult to obtain the desired property in a pneumatic tire provided with a side wall rubber using the rubber composition for a side wall. In addition, the epoxidiation rate of the epoxidized natural rubber (ENR) is preferably 65 mol % or less, more preferably 50 mol % or less. When the epoxidization rate of the epoxidized natural rubber (ENR) exceeds 65 mol %, a hardness is excessively increased, and there is a tendency that it is difficult to obtain the desired property such as fatigue resistance, in a pneumatic tire provided with a side wall rubber using the rubber composition for a side wall.

More typically, examples of the epoxidized natural rubber (ENR) include an epoxidized natural rubber having the epoxidization rate of 25 mol %, and an epoxidized natural rubber having the epoxidization rate of 50 mol %.

In the present invention, it is preferable that a content of the natural rubber component in the rubber component is 50% by mass or more. When the content of the natural rubber component in the rubber component is less than 50% by mass, there is a tendency that the effect of reducing a use amount of a raw material derived from a petroleum source is not obtained sufficiently. The content of the natural rubber component in the rubber component is preferably 20% by mass or more, more preferably 50% by mass or more. From a viewpoint that the effect of reducing a use amount of a raw material derived from a petroleum source is better, although it is preferable that the content of the natural rubber component in the rubber component is 100% by mass (that is, the rubber component consists of the natural rubber component), for example, the content of the natural rubber component in the rubber component is 40% by mass or less, further 20% by mass or less, and a rubber other than the natural rubber component as a remaining part in the rubber component may be compounded.

In addition, the rubber component may contain a rubber derived from a petroleum source in such a range that the effect of the present invention is not deteriorated. Examples of the rubber derived from a petroleum source include such as a styrene butadiene rubber (SBR), a butadiene rubber (BR), a styrene isoprene copolymer rubber, an isoprene rubber (IR), a butyl rubber (IIR), a chloroprene rubber (CR), an acrylonitrile butadiene rubber (NBR), a halogenated butyl rubber (X-IIR), and a halide of a copolymer of isoprene and p-methylstyrene. Among them, in a pneumatic tire provided with a side wall rubber using the rubber component for a side wall, SBR, BR, and IR are preferable since the desired property such as durability can be imparted.

<Silica>

The rubber composition for a side wall of the present invention contains silica in addition to the aforementioned rubber component. Silica functions as a reinforcing filler and, by compounding silica, a tensile strength of the resulting side wall rubber can be improved. In addition, since silica is derived from a source other than a petroleum, a use amount of a raw material derived from a petroleum source in the rubber composition can be reduced as compared with, for example, the case where a reinforcing agent derived from a petroleum source such as carbon black is compounded as a main reinforcing agent.

The rubber composition for a side wall of the present invention contains silica at 20 to 60 parts by mass based on 100 parts by mass of the aforementioned rubber component. When the content of silica is less than 20 parts by mass based on 100 parts by mass of the rubber component, a hardness of the rubber component is reduced, and operation stability is reduced in a pneumatic tire provided with a side wall rubber using the composition. On the other hand, when the content of silica exceeds 60 parts by mass based on 100 parts by mass of the rubber component, fatigue resistance is reduced in a pneumatic tire provided with a side wall rubber using the composition.

Silica may be silica prepared by a wet method, or silica prepared by a dry method. In addition, examples of a preferable commercially available product include Ultrasil VN2 (manufactured by Evonik Degussa Japan. Co., Ltd.) (BET specific surface area: 125 m$^2$/g), and Ultrasil VN3 (manufactured by Evonik Degussa Japan. Co., Ltd.) (BET specific surface area: 175 m$^2$/g).

<Terpene-Based Resin, Rosin-Based Resin>

The rubber composition for a side wall of the present invention contains at least any one of the terpene-based resin and the rosin-based resin. Among them, it is particularly preferable that the composition contains the terpene-based resin. Alternatively, a plurality of kinds of terpene-based resins, and rosin-based resins may be contained.

The "terpene-based resin" as used herein refers to a resin obtained by polymerizing, as a main monomer, a terpene compound contained in a plant essential oil obtained from generally a leaf, a tree, a root or the like of a plant. The terpene compound is generally a polymer of isoprene ($C_5H_8$), and is a compound in which terpene classified into such as monoterpene ($C_{10}H_{16}$), sesquiterpene ($C_{15}H_{24}$), and diterpene ($C_{20}H_{32}$) is a fundamental skeleton. Examples include such as α-pinene, β-pinene, dipentene, limonene, myrcene, alloocimene, ocimene, α-phellandrene, α-terpinene, γ-terpinene, terpinolene, 1,8-cineole, 1,4-cineole, α-terpineol, β-terpineol, γ-terpineol, camphene, tricyclene, sabinene, pararnenthadienes, and carenes.

The terpene-based resin in the present invention also includes, in addition to a terpene resin such as an α-pinene resin, a β-pinene resin, a limonene resin, a dipentene resin, and a β-pinene/limonene resin from a raw material of the aforementioned terpene compound, an aromatic modified terpene resin from a raw material of the terpene compound and an aromatic compound, a terpenephenol resin from a raw material of the terpene compound and a phenol-based compound, and a hydrogenated terpene resin in which the terpene resin was subjected to hydrotreatment. Here, examples of the aromatic compound being a raw material of the aromatic terpene resin in the present invention include such as styrene, α-methylstyrene, vinyltoluene, and divinyltoluene, and examples of the phenol-based compound being a raw material of the terpenephenol resin include such as phenol, bisphenol A, cresol, and xylenol.

As such the terpene-based resin, a commercially available product such as PX300N (manufactured by YASUHARA CHEMICAL CO., LTD.) can be suitably used.

In addition, the "rosin-based resin" as used herein includes a hydrogenated rosin resin, a modified rosin resin such as a maleic acid-modified rosin resin, and a rosin-modified phenol resin, and a disproportionated rosin resin obtained by disproportionating rosin ester such as rosin glycerin ester, or a rosin resin, in addition to a naturally occurring rosin resin (polymerized rosin) such as gum rosin, wood rosin, and tall oil rosin containing, as a main component, resin acid such as abietic acid, neoabietic acid, parastrinic acid, levopimaric acid, pimaric acid, isopimaric acid, and dehydroabietic acid, obtained by processing rosin.

As such the rosin-based resin, a commercially available product such as tall oil rosin TP90B (manufactured by Harima Chemicals, Inc.) can be suitably used.

The rubber composition for a side wall of the present invention contains at least any one of the aforementioned terpene-based resin and the rosin-based resin (particularly, terpene-based resin) at 0.5 to 15 parts by mass based on 100 parts by mass of the rubber component.

<Silane Coupling Agent>

The rubber composition for a side wall of the present invention contains silica as described above, and it is preferable that a silane coupling agent together with this silica is compounded. As the silane coupling agent, the previously known silane coupling agent can be used, and examples include sulfide-based silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl) trisulfide, bis(2-triethoxysilylethyl) trisulfide, bis(4-triethoxysilylbutyl)trisulfide, bis(3-trimethoxysilylpropyl)trisulfide, bis(2-trimethoxysilylethyl) trisulfide, bis(4-trimethoxysilylbutyl)trisulfide, bis(3-triethoxysilylpropyl)disulfide, bis(2-triethoxysilylethyl) disulfide, bis(4-triethoxysilylbutyl)disulfide, bis(3-trimethoxysilylpropyl)disulfide, bis(2-trimethoxysilylethyl) disulfide, bis(4-trimethoxysilylbutyl)disulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 2-trimethoxysilylethyl-N,N-dimethylthiocarbamoyl tetrasulfide, 3-trimethoxysilylpropylbenzothiazolyl tetrasulfide, 3-triethoxysilylpropylbenzothiazole tetrasulfide, 3-trimethoxysilylpropyl methacrylate monosulfide, 3-trimethoxysilylpropyl methacrylate monosulfide; mercapto-based silane coupling agents such as 3-mercaptopropyltrimethoxysilane, 3-mercaptopropyltriethoxysilane, 2-mercaptoethyltrimethoxysilane, and 2-mercaptoethyltriethoxysilane; vinyl-based silane coupling agents such as vinyltriethoxysilane, and vinyltrimethoxysilane; amino-based silane coupling agents such as 3-aminopropyltriethoxysilane, 3-aminopropyltrimethoxysilane, 3-(2-aminoethyl)

aminopropyltriethoxysilane, and 3-(2-aminoethyl)aminopropyltrimethoxysilane; glycidoxy-based silane coupling agents such as γ-glycidoxypropyltriethoxysilane, γ-glycidoxypropyltrimethoxysilane, γ-glycidoxypropylmethyldiethoxysilane, and γ-glycidoxypropylmethyldimethoxysilane; nitro-based silane coupling agents such as 3-nitropropyltrimethoxysilane, and 3-nitropropyltriethoxysilane; chloro-based silane coupling agents such as 3-chloropropyltrimethoxysilane, 3-chloropropyltriethoxysilane, 2-chloroethyltrimethoxysilane, and 2-chloroethyltriethoxysilane. These silane coupling agents may be used alone, or may be used by combining two or more kinds.

Among them, Si69 (manufactured by Evonik Degussa Japan. Co., Ltd.) (bis(3-triethoxysilylpropyl)tetrasulfide), and Si266 (manufactured by Evonik Degussa Japan. Co., Ltd.) (bis(3-triethoxysilylpropyl)disulfide) are preferably used based on the reason of better processibility.

<Carbon Black>

It is preferable that the rubber composition for a side wall of the present invention further contains carbon black as a reinforcing agent in such the range that the effect of the present invention is not deteriorated. By compounding carbon black, a better mechanical strength is imparted to the rubber composition for a side wall, but since carbon black is generally derived from a petroleum source, in order to reduce a use amount of a raw material derived from a petroleum source, it is preferable that a compounding amount of carbon black is 5 parts by mass or less, further 3 parts by mass or less, further 2 parts by mass or less based on 100 parts by mass of the rubber component. On the other hand, the compounding amount of carbon black is preferably 10 parts by mass or more, more preferably 15 parts of mass or more based on 100 parts by mass of the rubber component in that the effect of improving a mechanical strength by compounding carbon black is obtained better.

Examples of a preferable commercially available product of carbon black include

Show Black N220 (manufactured by Cabot Japan K.K.).

<Other Compounding Ingredient>

In the rubber composition for a side wall of the present invention, in addition to the aforementioned components, other compounding ingredient having been previously used in the rubber industry, for example, a vulcanizing agent, stearic acid, a vulcanization accelerator, a vulcanization accelerator auxiliary agent, an oil, a hardened resin, a wax, and an aging preventing agent may be compounded.

As the vulcanizing agent, organic peroxide or a sulfur-based vulcanizing agent can be used and, as the organic peroxide, for example, benzoyl peroxide, dicumyl peroxide, di-t-butyl peroxide, t-butylcumyl peroxide, methyl ethyl ketone peroxide, cumene hydroperoxide, 2,5-dimethyl-2,5-di(t-butylperoxy)hexane, 2,5-dimethyl-2,5-di(benzoylperoxy)hexane, 2,5-dimethyl-2,5-di(t-butylperoxy)hexyne-3 or 1,3-bis(t-butylperoxypropyl)benzene, di-t-butylperoxy-diisopropylbenzene, t-butylperoxybenzene, 2,4-dichlorobenzoyl peroxide, 1,1-di-t-butylperoxy-3,3,5-trimethylsiloxiane, and n-butyl-4,4-di-t-butylperoxyvalerate can be used. Among them, dicumyl peroxide, t-butylperoxybenzene and bi-t-butylperoxy-diisopropylbenzene are preferable. In addition, as the sulfur-based vulcanizing agent, for example, sulfur, and morpholine disulfide can be used. Among them, sulfur is preferable. These vulcanizing agents may be used alone, or may be used by combining two or more kinds.

As the vulcanizing accelerator, an accelerator containing at least one of sulfenamide-based, thiazole-based, thiuram-based, thiourea-based, guanidine-based, dithiocarbamic acid-based, aldehyde-amine-based or aldehyde-ammonia-based, imidazoline-based, and xanthate-based vulcanization accelerators can be used. As the sulfenamide-based vulcanization accelerators, sulfenamide-based compounds such as CBS (N-cyclohexyl-2-benzothiazylsulfenamide), TBBS (N-tert-butyl-2-benzothiazylsulfenamide), N,N-dicyclohexyl-2-benzothiazylsulfenamide, N-oxydiethylene-2-benzothiazylsulfenamide, and N,N-diisopropyl-2-benzothiazolesulfenamide can be used. As the thiazole-based vulcanization accelerator, thiazole-based compounds such as MBT (2-mercaptobenzothiazole), MBTS (dibenzothiazyl disulfide), a sodium salt, a zinc salt or a copper salt of 2-mercaptobenzothiazole, a cyclohexylamine salt, 2-(2,4-dinitrophenyl)mercaptobenzothiazole, and 2-(2,6-diethyl-4-morpholinothio)benzothiazole can be used. As the thiuram-based vulcanization accelerator, thiuram-based compounds such as TMTD (tetramethylthiuram disulfide), tetraethylthiuram disulfide, tetramethylthiuram monosulfide, dipentamethylenethiuram disulfide, dipentamethylenethiuram monosulfide, dipentamethylenethiuram tetrasulfide, dipentamethylenethiuram hexasulfide, tetrabutylthiuram disulfide, and pentamethylenethiuram tetrasulfide can be used. As the thiourea-based vulcanization accelerator, thiourea compounds such as thiacarbamide, diethylthiourea, dibutylthiourea, trimethylthiourea, and diorthotolylthiourea can be used. As the guanidine-based vulcanization accelerator, guanidine-based compounds such as diphenylguanidine, diorthotolylguanidine, triphenylguanidine, orthotolylbiguanide, and diphenylguanidine phthalate can be used. As the dithiocarbamic acid-based vulcanization accelerator, dithiocarbamic acid-based compounds such as zinc ethylphenyldithiocarbamate, zinc butylphenyldithiocarbamate, sodium dimethyldithiocarbamate, zinc dimethyldithiocarbamate, zinc diethyldithiocarbamate, zinc dibutyldithiocarbamate, zinc diamyldithiocarbamate, zinc dipropyldithiocarbamate, a complex salt of zinc pentamethylenedithiocarbamate and piperidine, zinc hexadecyl (or octadecyl)isopropyldithiocarbamate, zinc dibenzyldithiocarbamate, sodium diethyldithiocarbamate, pentamethylenedithiocarbamic acid piperidine, selenium dimethyldithiocarbamate, tellurium diethyldithiocarbamate, and cadmium diamyldithiocarbamate can be used. As the aldehyde-amine-based or aldehyde-ammonia-based vulcanization accelerator, aldehyde-amine-based or aldehyde-ammonia-based compounds such as an acetoaldehyde-aniline reaction product, a butylaldehyde-aniline condensate, hexamethylenetetramine, and an acetoaldehyde-ammonia reaction product can be used. As the imidazoline-based vulcanization accelerator, imidazoline-based compounds such as 2-mercaptoimidazoline can be used. As the xanthate-based vulcanization accelerator, xanthate-based compound such as zinc dibutylxanthogenate can be used. These vulcanization accelerators may be used alone, or may be used by combining two or more kinds.

As the vulcanization accelerator auxiliary agent, for example, zinc oxide, and stearic acid can be used.

As the aging preventing agent, amine-based agent, phenol-based agent, imidazole-based agent, and a carbamic acid metal salt can be used by appropriate selection.

The rubber composition for a side wall of the present invention may contain a stearic acid metal salt. Examples of the stearic acid metal salt include such as magnesium stearate, magnesium 12-hydroxystearate, calcium stearate, calcium 12-hydroxystearate, barium stearate, barium 12-hydroxystearate, zinc stearate, and zinc 12-hydroxystearate. Among the stearic acid metal salt, from a viewpoint of the effect of improving heat resistance, and compatibility with the epoxidized natural rubber, a stearic acid alkaline earth metal salt is preferable, and calcium stearate, calcium 12-hydroxystearate, barium stearate, and barium 12-hydroxystearate are more preferable.

Examples of the oil include such as a process oil, a vegetable oil, and a mixture thereof. Examples of the process oil include such as a paraffin-based process oil, a naphthene-based process oil, and an aromatic-based process oil. Examples of the vegetable oil include such as a castor oil, a cotton seed oil, a linseed oil, a rapeseed oil, a soybean oil, a palm oil, a coconut oil, a peanut oil, a pine oil, a pine tar, a tall oil, a corn oil, a rice oil, a safflower oil, a sesame oil, an olive oil, a sunflower oil, a palm kernel oil, a camellia oil, a jojoba oil, a macadamia nut oil, a safflower oil, and a paulownia oil.

The rubber composition for a side wall of the present invention has enabled to realize both of maintenance of the properties desired in the rubber composition for a side wall such as durability, and improvement in processibility while a use amount of a raw material derived from a petroleum source is reduced. Here, improved "processibility" refers to that a stickiness index calculated by the following calculating equation from a tacking force of an unvulcanized rubber composition measured using PICMATAC tester (manufactured by Toyo Seiki Seisaku-sho, Ltd.) according to the provision of JIS-T 9233 (details such as measuring condition will be described later) is 105 or more (further preferably 110 or more).

Stickiness Index=(tacking force of rubber composition of the present invention/tacking force of standard compounding rubber composition)×100

The standard compounding rubber composition in the aforementioned calculating equation refers to a rubber composition in which components are compounded into the same composition as that of the rubber composition of the present invention except that the terpene-based resin and the rosin-based resin are not contained.

The present invention also provides a pneumatic tire provided with a side wall rubber using the aforementioned rubber composition for a side wall of the present invention. Here, FIG. 1 is a schematic cross-sectional view showing one example of the pneumatic tire of the present invention. The pneumatic tire 1 includes a tread part 2, a pair of side wall parts 3 extending inwardly in a tire radial direction from both ends of tread part 2, and a bead part 4 situated at an inner end of each side wall part 3. In addition, a carcass part 6 is bridged between bead parts 4, 4 and, at the same time, a belt layer 7 having the hoop effect to reinforce tread part 2 is disposed on an outer side of this carcass 6 and in tread part 2.

Above mentioned carcass 6 is formed of one or more carcass plies 6a in which a carcass cord is arranging at an angle of, for example, 70 to 90° relative to a tire equator CO, and this carcass ply 6a is locked by turning up from an inner side to an outer side in a tire axial direction around a bead core 5 of bead part 4 via from the aforementioned tread part 2 to side wall part 3.

Above mentioned belt layer 7 is formed of two or more belt plies 7a in which a belt cord is arranged at an angle of, for example, 40° or less relative to a tire equator CO, and each belt cord is piled up in different directions so as to cross between plies. If necessary, a band layer (not shown) for preventing lifting of both ends of belt layer 7 may be provided at least outside belt layer 7 and, thereupon, the band layer is formed of a continuous ply in which an organic fiber cord having a low modulus is spirally wound approximately parallel with the tire equator CO.

In addition, in bead part 4, a bead apex rubber 8 extending outwardly in a radial direction from bead core 5 is disposed and, at the same time, on an inner side of carcass 6, an inner liner rubber 9 forming a tire inner cavity surface is provided adjacent, and an outer side of carcass 6 is protected with a clinch rubber 4G and a side wall rubber 3G. The rubber composition for a side wall of the present invention is used in the aforementioned side wall rubber 3G.

FIG. 1 exemplifies the pneumatic tire for a passenger automobile, but the present invention is not limited to this, and provides a pneumatic tire being used in application of various vehicles such as a passenger automobile, a truck, a bus, and a heavy vehicle.

The pneumatic tire of the present invention is produced by the previously known method using the rubber composition for a side wall of the present invention. That is, an unvulcanized tire is formed by kneading a rubber composition for a side wall containing the aforementioned essential components and other compounding ingredient which is compounded if necessary, extrusion-processing the rubber composition in conformity with a shape of a side wall rubber of a tire at a stage of unvulcanization, and molding the processed material together with other members on a tire molding machine by a conventional method. By heating and pressing this unvulcanized tire in a vulcanizing machine, the tire of the present invention can be obtained.

Since such the pneumatic tire of the present invention uses a rubber composition in which a content ratio of components derived from a petroleum source in the side wall rubber is further reduced, source saving and environmental protection are sufficiently considered, and at the same time, both of maintenance of better physical property and improvement in processibility are realized, it is an "ecological tire" being friendly to the earth environment and, at the same time, has improved processibility, and further desired properties.

The present invention will be described in more detail below by way of Examples and Comparative Examples, but the present invention is not limited to these Examples,

EXAMPLE 1 AND COMPARATIVE EXAMPLES 1 AND 2

According to compounding formulation shown in Table 1, and using a 1.7 L Banbury mixer manufactured by KOBE STEEL, LTD., compounding components except for sulfur and a vulcanization accelerator were charged so that a charging rate became 58%, and the mixture was kneaded at a rotation number of 80 rpm for 3 minutes until a temperature reached at 140° C. Then, after sulfur and a vulcanization accelerator were added to the resulting kneaded product at compounding amounts shown in Table 1, the mixture was kneaded at 80° C. for 5 minutes using an open roll to obtain unvulcanized rubber compositions having compounding related to Example 1 and Comparative Examples 1 and 2.

TABLE 1

|  |  | Example 1 | Comparative Example 1 | Comparative Example 2 |
|---|---|---|---|---|
| Compounding amount (part by mass) | Natural rubber | 80 | 80 | 80 |
|  | Epoxidized natural rubber | 20 | 20 | 20 |
|  | Carbon black | 5 | 5 | 5 |
|  | Silica | 45 | 45 | 45 |
|  | Silane Coupling agent | 3.6 | 3.6 | 3.6 |

TABLE 1-continued

|  |  | Example 1 | Comparative Example 1 | Comparative Example 2 |
|---|---|---|---|---|
|  | Oil | 8 | 8 | 8 |
|  | Resin (1) | — | 3 | — |
|  | Resin (2) | 3 | — | — |
|  | Wax | 1.2 | 1.2 | 1.2 |
|  | Age resister | 2.4 | 2.4 | 2.4 |
|  | Stearic acid | 1 | 1 | 1 |
|  | Zinc oxide | 3 | 3 | 3 |
|  | Sulfur | 1.0 | 1.0 | 1.0 |
|  | Vulcanization Accelerator | 2.0 | 2.0 | 2.0 |
| Rubber processibility | Stickiness | 119 | 100 | 52 |

Details of various compounding components used in Examples and Comparative Examples are as follows.
(1) Natural rubber (NR): RSS#3 (manufactured by Teck Bee Hung)
(2) Epoxidized natural rubber (ENR): ENR25 (manufactured by Kumpulan Guthrie Berhad) (epoxidization rate: 25%)
(3) Carbon black: Show Black N220 (manufactured by Cabot Japan K.K.)
(4) Silica: Ultrasil VN3 (manufactured by Evonik Degussa Japan Co., Ltd.)
(5) Silane coupling agent: Si69 (manufactured by Evonik Degussa Japan Co., Ltd.)
(6) Oil: NH60 (manufactured by Idemitsu Kosan Co., Ltd)
(7) Resin (1): Marcalets T100AS (manufactured by Maruzen Petrochemical Co., Ltd)
(8) Resin (2): Terpene resin PX300N (manufactured by YASUHARA CHEMICAL CO., LTD.)
(9) Wax: Sunnoc Wax (manufactured by OUCHI SHINKO CHEMICAL INDUSTRIAL CO., LTD.)
(10) Age resister: Nocrac 6C (manufactured by OUCHI SHINKO CHEMICAL INDUSTRIAL CO., LTD.) (N-(1,3-dimethylbutyl)-N'-phenyl-p-phenylenediamine))
(11) Stearic acid: Paulownia (manufactured by Nippon Oil & Fat Co., Ltd.)
(12) Zinc oxide: Zinc white (manufactured by MITSUI MINING & SMELTING CO., LTD.)
(13) Sulfur: powdery sulfur (manufactured by Tsurumi Chemical Co., Ltd.)
(14) Vulcanization accelerator: Nocceler NS (manufactured by OUCHI SHINKO CHEMICAL INDUSTRIAL CO., LTD.)

Unvulcanized rubber compositions obtained in Examples and Comparative Examples were subjected to the following test. Table 1 also shows the test results.

(Stickiness Test)
A tacking force [N] of the unvulcanized rubber composition was measured under the condition of a measuring temperature of 23° C., a load of 4.9N, a standing time of 10 seconds, and a peeling rate of 30 mm/min using a PICMATAC tester (manufactured by Toyo Seiki Seisaku-sho, Ltd.) according to the provision of JIS-T 9233. Further, as a standard compounding rubber composition, letting a stickiness index of the rubber composition of Comparative Example 1 to be 100, a tacking force was expressed by an index by the following calculating equation.

Stickiness index=(tacking force of each Example and each Comparative Example/tacking force of standard compounding)×100

Although the present invention has been described and illustrated in detail, it is clearly understood that the same is by way of illustration and example only and is not to be taken by way of limitation, the scope of the present invention being interpreted by the terms of the appended claims.

The invention claimed is:

1. A pneumatic tire having a tread and a side wall, wherein the side wall is formed from a composition comprising a natural rubber component consisting of a natural rubber and epoxidized natural rubber, a deproteinized natural rubber or a hydrogenated natural rubber; 20 to 60 parts by mass of silica; 0.5 to 15 parts by mass of at least any one of a terpene-based resin and a rosin-based resin; and carbon black present in an amount of not more than 5 parts by mass; based on 100 parts by mass of the rubber component.

2. The tire according to claim 1, wherein the natural rubber component consists of a natural rubber and the epoxidized natural rubber.

3. The tire according to claim 1, wherein said rubber composition consists of said natural rubber component.

* * * * *